(12) United States Patent
Tanzawa et al.

(10) Patent No.: US 9,440,153 B2
(45) Date of Patent: Sep. 13, 2016

(54) GAME APPARATUS

(71) Applicant: KABUSHIKI KAISHA SQUARE ENIX, Tokyo (JP)

(72) Inventors: Yuuichi Tanzawa, Shinjuku-ku (JP); Daisuke Miyata, Tokyo (JP); Yoshimasa Asao, Tokyo (JP); Tetsuro Uchida, Chiyoda-ku (JP)

(73) Assignee: KABUSHIKI KAISHA SQUARE ENIX CO., LTD., Tokyo (JP)

( * ) Notice: Subject to any disclaimer, the term of this patent is extended or adjusted under 35 U.S.C. 154(b) by 99 days.

(21) Appl. No.: 13/922,584

(22) Filed: Jun. 20, 2013

(65) Prior Publication Data

US 2014/0011583 A1 Jan. 9, 2014

(30) Foreign Application Priority Data

Jul. 9, 2012 (JP) ................................. 2012-154174

(51) Int. Cl.
| | |
|---|---|
| A63F 9/00 | (2006.01) |
| A63F 13/90 | (2014.01) |
| A63F 13/00 | (2014.01) |
| A63F 13/2145 | (2014.01) |

(52) U.S. Cl.
CPC .............. *A63F 13/90* (2014.09); *A63F 13/00* (2013.01); *A63F 13/08* (2013.01); *A63F 13/2145* (2014.09); *A63F 2300/20* (2013.01)

(58) Field of Classification Search
None
See application file for complete search history.

(56) References Cited

U.S. PATENT DOCUMENTS

| | | | |
|---|---|---|---|
| 5,853,327 A * | 12/1998 | Gilboa | 463/39 |
| 6,464,503 B1 * | 10/2002 | Heit et al. | 434/156 |
| 7,431,297 B2 * | 10/2008 | Kaji et al. | 273/237 |
| 8,020,869 B2 | 9/2011 | Kaji et al. | |
| 8,172,229 B2 | 5/2012 | Kaji et al. | |
| 8,191,896 B2 | 6/2012 | Kaji et al. | |
| 8,202,155 B2 * | 6/2012 | Uchiyama | 463/23 |
| 8,248,666 B2 * | 8/2012 | Kenji | 358/3.29 |
| 8,360,877 B2 | 1/2013 | Matsumura | |
| 8,556,266 B2 * | 10/2013 | Yoshida | 273/293 |
| 8,740,706 B2 * | 6/2014 | Klein et al. | 463/37 |
| 2002/0147514 A1 * | 10/2002 | Apple et al. | 700/92 |
| 2003/0060270 A1 * | 3/2003 | Binkley et al. | 463/20 |
| 2003/0130037 A1 * | 7/2003 | Sugimori et al. | 463/37 |
| 2003/0171142 A1 | 9/2003 | Kaji et al. | |
| 2004/0204225 A1 * | 10/2004 | Campo et al. | 463/19 |
| 2006/0160627 A1 * | 7/2006 | Fujimori | 463/43 |

(Continued)

FOREIGN PATENT DOCUMENTS

| | | |
|---|---|---|
| EP | 1319430 | 6/2003 |
| JP | 2002-301264 | 10/2002 |
| JP | 2006-006657 | 1/2006 |

*Primary Examiner* — Seng H Lim
(74) *Attorney, Agent, or Firm* — Greenblum & Bernstein, P.L.C

(57) ABSTRACT

The present invention is to provide a game apparatus with good operability which includes a card reader and a touch panel display and enables a player to operate a card even without looking the card reader with eyes and to perform an input operation while looking the touch panel display. The present invention includes a touch panel display, and a card reader including a panel on which a card used in a game is set. The present invention further includes a display support section which supports the touch panel display, and a panel support section which supports the panel of the card reader. Furthermore, the present invention is characterized in that the display support section supports the touch panel display such that at least a portion of the touch panel display is located above at least a portion of the panel in a vertical direction.

15 Claims, 8 Drawing Sheets

(56) References Cited

U.S. PATENT DOCUMENTS

| | | |
|---|---|---|
| 2006/0183544 A1* | 8/2006 | Okada .............................. 463/31 |
| 2007/0080222 A1* | 4/2007 | Inubushi et al. .............. 235/439 |
| 2007/0275782 A1 | 11/2007 | Kaji et al. |
| 2008/0085749 A1 | 4/2008 | Kaji et al. |
| 2008/0090658 A1* | 4/2008 | Kaji et al. ....................... 463/31 |
| 2008/0113708 A1* | 5/2008 | Beadell et al. ................ 463/16 |
| 2008/0132305 A1 | 6/2008 | Kaji et al. |
| 2009/0054138 A1* | 2/2009 | Uchiyama et al. ............. 463/31 |
| 2009/0321521 A1* | 12/2009 | Takano et al. ........... 235/462.11 |
| 2010/0124962 A1* | 5/2010 | Chudek et al. ................. 463/13 |
| 2010/0302171 A1* | 12/2010 | Yoshida ........................ 345/173 |
| 2011/0049234 A1* | 3/2011 | Yoshida ........................ 235/380 |
| 2011/0165923 A1* | 7/2011 | Davis et al. ..................... 463/1 |
| 2012/0220363 A1* | 8/2012 | Bytnar et al. .................. 463/25 |
| 2012/0322557 A1 | 12/2012 | Tanzawa |
| 2013/0102390 A1* | 4/2013 | Klein et al. ..................... 463/37 |
| 2013/0207909 A1 | 8/2013 | Tanzawa et al. |

\* cited by examiner

Y-Y

Y-Y

GAME APPARATUS

TECHNICAL FIELD

The present invention relates to a game apparatus. More specifically, the game apparatus of the present invention has a touch panel display and a card reader on which a card is set. Furthermore, the game apparatus of the present invention can advance a game by displaying various images on the touch panel display while reading unique information from the card by the card reader.

BACKGROUND ART

Conventionally, a game apparatus which allows a player to play a game by using a plurality of cards with a code having unique data printed thereon is known (for example, Patent Literature 1). That is, the conventional game apparatus has a play field on which an arbitrary card is selectively set, a card data reading means which reads data of a card set on the play field, an image generating means which generates an image corresponding to card data read by the card data reading means, and a display means which displays a game image generated by the image generating means.

Further, as disclosed in Patent Literature 2, a game apparatus which allows a player to play a game by using a card and has a card reader and a touch panel display is also known. The game apparatus of Patent Literature 2 generates a character image based on card data read by the card reader, and displays the character image on the touch panel display. Furthermore, when the player touches the character image through the touch panel display, an operation instruction on a character is input to the game apparatus and a game is advanced based on the input operation instruction. Thus, in recent years, the game apparatus mounted with the card reader and the touch panel display is attracting attention because it can provide various games which are different in taste from conventional games.

CITATION LIST

Patent Literatures

Patent Literature 1: JP 2002-301264 A
Patent Literature 2: JP 2006-6657 A

SUMMARY OF INVENTION

Technical Problem

However, in the game apparatus of Patent Literature 2, with respect to the standing position of the player, the card reader for setting an arbitrary card is provided at the front side, a 7-segment indicator is provided at the back side of the card reader, and the touch panel display is provided at the more back side of the 7-segment indicator. Therefore, the player needs to set an arbitrary card on the card reader or to stretch out his hand to the touch panel display which is slightly distant from the card reader, when operating the touch panel display while moving the set card. Thus, when the touch panel display is distant from the card reader, it is difficult for the player to operate the touch panel display with the other hand while operating the card on the card reader with one hand.

Further, as in the game apparatus of Patent Literature 2, when the touch panel display is distant from the card reader, the player has to look the card reader when operating the card on the card reader and has to look the touch panel display when operating the touch panel display. Therefore, problematically, game operability is degraded because it is difficult for the player to operate the touch panel display while operating the card on the card reader.

Particularly, when a game executed by the game apparatus is displayed on the touch panel display and is advanced in real time (for example, in the case of an action game and a simulation game), there is also a situation in which the player has to continuously operate the touch panel display and the card on the card reader almost simultaneously. In this situation, the player needs to operate the card with his eyes taken off the card reader while always looking the touch panel display. However, problematically, as described above, when the touch panel display is distant from the card reader, the player cannot concentrate on the game which is displayed and advanced on the touch panel display, because it is difficult for the player to look off the card reader when operating the card. Therefore, the game apparatus of Patent Literature 2 is considered to be unsuitable for a game in which the situation changes in real time.

Therefore, currently, there is required a game apparatus with good operability which includes a card reader and a touch panel display and enables a player to operate a card even without looking the card reader with eyes and to perform an input operation while looking the touch panel display.

Solution to Problem

Hence, the inventors of the present invention obtained knowledge as a result of devoted study of means for solving the above problem of the conventional invention that, by locating at least a portion of the touch panel display above the card reader in a vertical direction, it is possible for the touch panel display to be close to the card reader, and it is easy for the player to operate the touch panel display and the card on the card reader simultaneously. That is, by this configuration, the player can operate the card even without looking the card reader, and can perform an input operation while looking the couch panel display. Furthermore, the inventors of the present invention arrived at solving the problem of the conventional technique based on the above knowledge, and made the present invention.

More specifically, the present invention has the following configuration.

The present invention relates to a game apparatus.

The game apparatus of the present invention includes a touch panel display 10, and a card reader 20 including a panel 21 on which a card used in a game is set.

Further, the game apparatus of the present invention includes a display support section 30 which supports the touch panel display 10, and a panel support section 40 which supports the panel 21 of the card reader 20.

Furthermore, the display support section 30 supports the touch panel display 10 such that at least a portion of the touch panel display 10 is located above at least a portion of the panel 21 in a vertical direction.

As in the above configuration, by locating the touch panel display 10 above the panel 21 of the card reader 20, both the touch panel display 10 and the panel 21 come into the view of the player. Therefore, the player can easily operate the card on the card reader 20 even while looking the touch panel display 10.

Further, by locating the touch panel display 10 above the panel 21 of the card reader 20, the touch panel display 10 becomes close to the panel 21. Therefore, the player can easily operate the touch panel display 10 and the card on the panel 21 simultaneously.

In the present invention, preferably, the display support section 30 may support the touch panel display 10 such that a gap is formed between the touch panel display 10 and the panel 21.

As in the above configuration, since a gap is formed between the touch panel display 10 and the panel 21 of the card reader 20, the player can operate the card on the panel 21 without being disturbed by the touch panel display 10 even when the touch panel display 10 is located above the panel 21. Therefore, preferably, the height between the touch panel display 10 and the panel 21 may be a level allowing the entrance of the player's hand (for example, 50 mm to 150 mm).

In the present invention, when a side close to the standing position of the player with respect to the game apparatus is defined as a front side and a side distant from the standing position of the player is defined as a back side, it may be preferable the display support section 30 supports the touch panel display 10 such that a portion of the front side of the touch panel display 10 is located above a portion of the back side of the panel 21 in the vertical direction.

As in the above configuration, since the touch panel display 10 is located above a portion of the back side of the panel 21 in the vertically direction from the viewpoint of the standing position of the player, the player can easily touch the touch panel display 10 while operating the card on the panel 21.

In the present invention, preferably, a step section 47 may be formed at a position contacting at least an end edge of the front side of the panel 21.

As in the above configuration, since the step section 47 is provided at a position contacting the end edge of the front side of the panel 21, the player can abut an arbitrary card on the step section 47 and arrange the card at the end edge of the front side of the panel 21. For example, in a case where game advancement changes under the condition that a specific card is located in a region of the front side of the panel 21, since the step section 47 is provided, the player can easily locate the specific card in the region of the front side of the panel 21. Further, by providing the step section 47 at the position contacting the end edge of the front side of the panel 21, it is possible to prevent the card from dropping from the panel 21.

In the present invention, the display support section 30 may be provided with a sensor 50 for sensing a card set on the panel 21 or a human hand which handles the card. The sensor 50 may be a known sensor such as an infrared sensor, an area sensor, a CCD image sensor, or a CMOS image sensor.

Since a portion of the touch panel display 10 is located above a portion of the panel 21 of the card reader 20, the present invention may employ a configuration in which a portion of the display support section 30 extends above the panel 21. Therefore, by attaching the sensor 50 to the display support section 30, it is possible to detect a card set on the panel 21 or a human hand which handles the card. For example, the sensor 50 may be used to detect the disposition position of a card on the panel 21 and the position of the player's hand which handles the card, and the disposition position of the card on the panel 21 and the position of the hand may be displayed on the touch panel display 10 based on the detected information. By this means, the player can easily know the disposition position of the card on the panel 21 and the position of his hand just by looking the touch panel display 10 even without looking the panel 21.

Advantageous Effects of Invention

As described above, according to the present invention, since the touch panel display 10 is located above the panel 21 of the card reader 20, both the touch panel display 10 and the panel 21 come into the view of the player. Accordingly, the player can easily operate the card on the card reader 20 even while looking the touch panel display 10.

Further, according to the present invention, since the touch panel display 10 is located above the panel 21 of the card reader 20, the touch panel display 10 becomes relatively close to the panel 21. Accordingly, the player can easily operate the touch panel display 10 and the card on the panel 21 simultaneously.

DESCRIPTION OF EMBODIMENTS

An embodiment for implementing the present invention will be described below with reference to the drawings. The present invention is by no means limited to the embodiment described below, and incorporates embodiments obtained by adequately modifying the following embodiment in a range obvious for one of ordinary skill in art.

Figure 1:
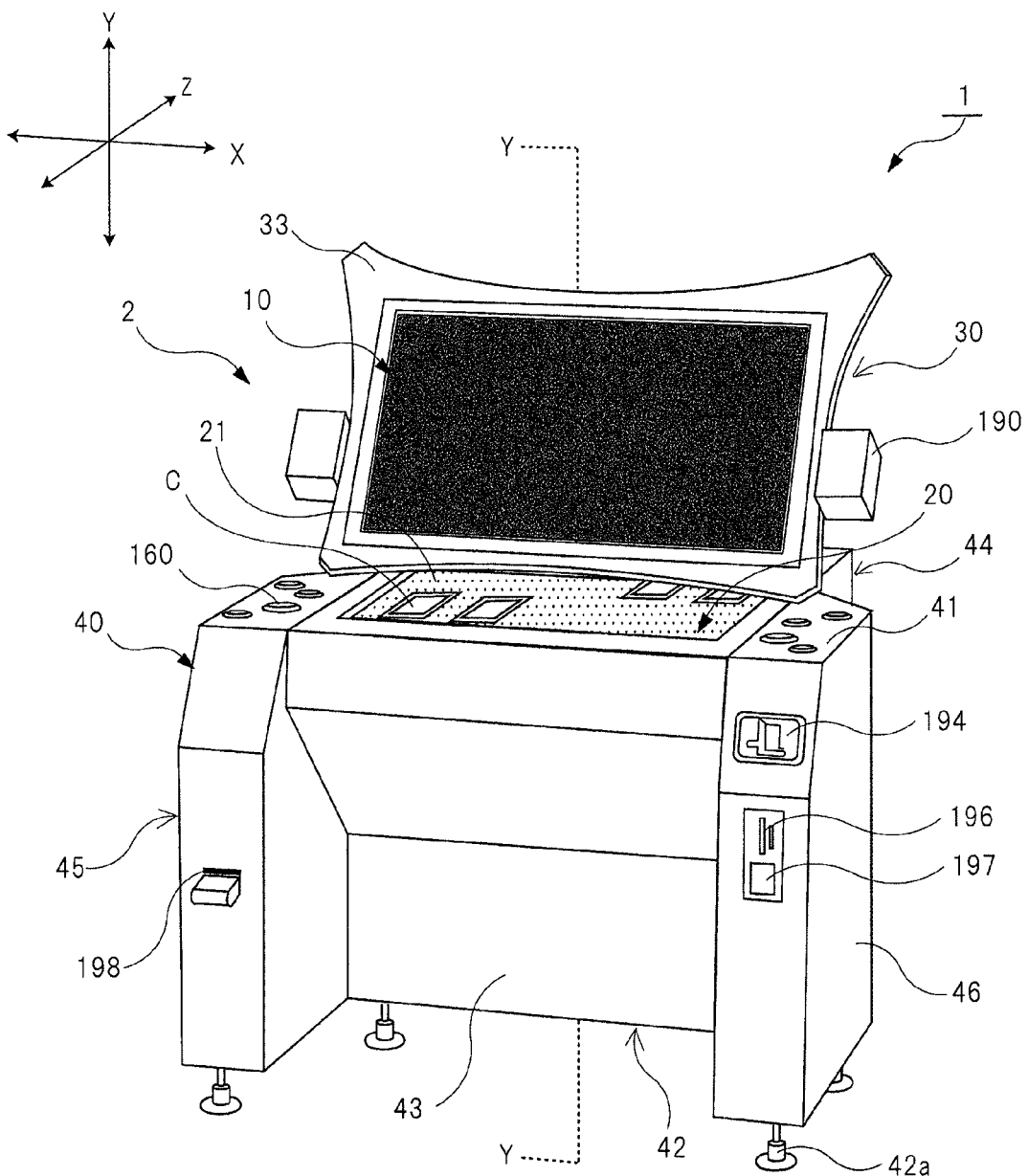
FIG. 1 is a perspective view illustrating an example of an outlook of a game apparatus.

In addition, in the drawings of the present application, orthogonal coordinate axes of X axis, Y axis and Z axis are set for easy understanding of the 3D direction. In FIG. 1 or the like, the X axis represents a horizontal direction, the Y axis represents a vertical direction, and the Z axis represents a depth direction.

Further, in the specification of the present application, "front side" and "back side" respectively represent the front side and the back side of a game apparatus in the depth direction (Z axis direction) with respect to the standing position of a player.

Furthermore, in the specification of the present application, "A to B" represents "A or more and B or less".

1. Housing Structure of Game Apparatus

First, a housing structure of a game apparatus according to an embodiment of the present invention will be described.

Figure 2:
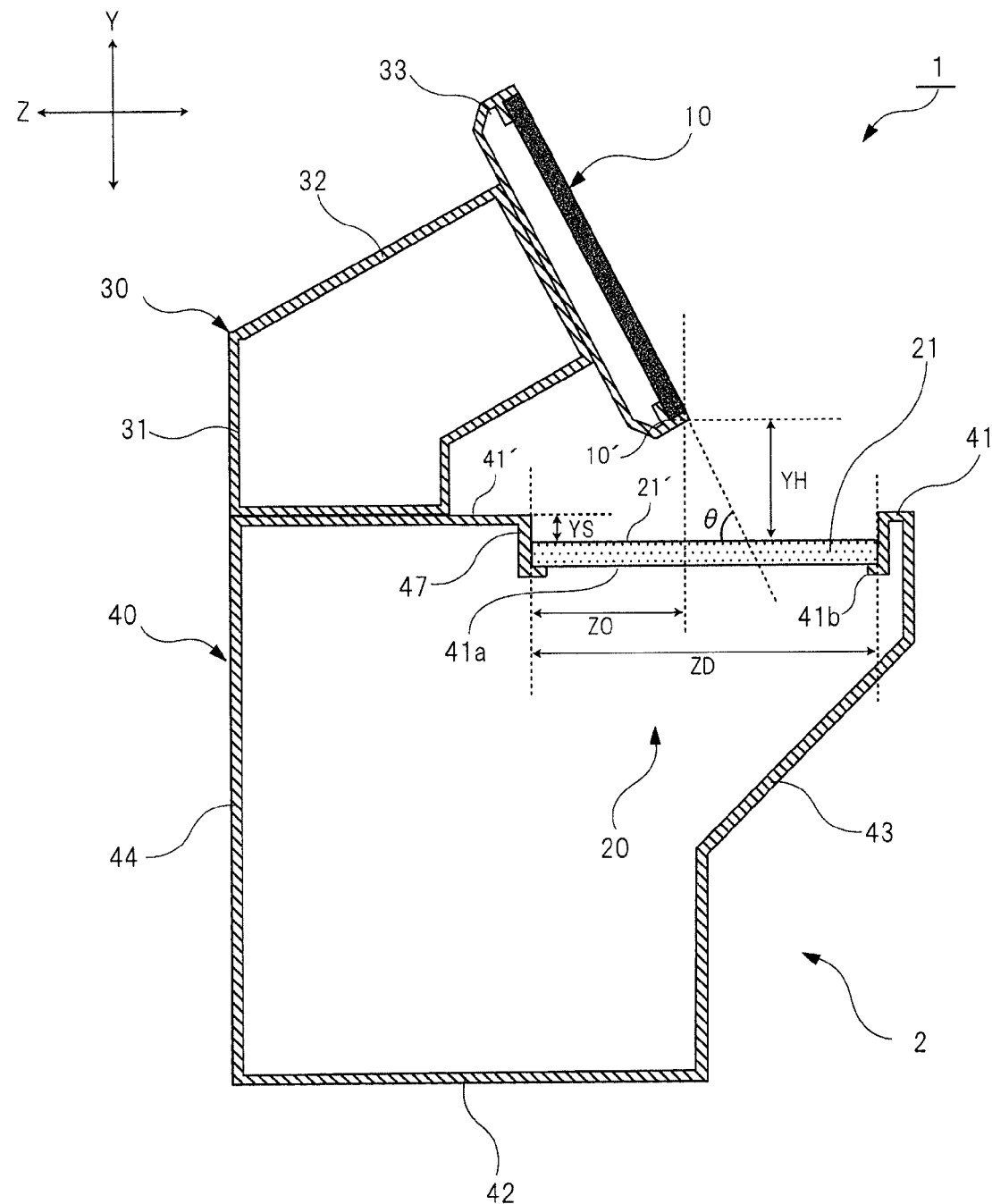
FIG. 2 is a schematic cross-sectional view taken along line Y-Y illustrated in FIG. 1.

FIG. 1 is a perspective view illustrating an outlook of a game apparatus 1 according to an embodiment. Further, FIG. 2 is a schematic cross-sectional view taken line Y-Y illustrated in FIG. 1. As illustrated in FIGS. 1 and 2, the game apparatus 1 of the present invention basically includes a touch panel display 10, a card reader 20, and a housing 2 which supports the touch panel display 10 and t card reader 20. As illustrated in FIG. 1, the present invention can be appropriately applied to a so-called arcade game apparatus.

The touch panel display 10 displays various image data as images visible to a player, and has a configuration in which the coordinate on a display screen touched by the player can be detected. The touch panel display 10 can detect contact of the player's finger according to a known electrostatic capacitance method, electromagnetic induction method, infrared scan method, resistance film method or ultrasonic surface acoustic wave method, and obtain coordinate information. Further, the card reader 20 has an approximately rectangular panel 21 on which a plurality of cards C is set. In a game provided by the game apparatus of the present invention, a card C with an identification code printed at least one of the front surface or the rear surface thereof is used. When the card C is set on the panel 21, the card reader 20 is configured to read the identification code printed on the card C and obtain unique card information of the card. The panel 21 has a flat plane 21' on which a plurality of cards C can be set and can be slidably moved.

The configurations of the touch panel display and the card reader are known as illustrated in, for example, Patent Literature 1 or Patent Literature 2. The present invention can employ a known touch panel display and card reader appropriately.

Further, as illustrated in FIGS. 1 and 2, the game apparatus 1 includes the housing 2. The housing 2 supports the touch panel display 10 and the panel 21 of the card reader 20 at a position which can be operated by the player. That is, as illustrated in the schematic cross-section view of FIG. 2, the housing 2 includes a display support section 30 which supports the touch panel display 10, and a panel support section 40 which supports the panel 21 of the card reader 20. Furthermore, various electronic devices for operating the touch panel display 10 and the card reader 20 and various electronic devices for executing a game by using the touch panel display 10 and the card reader 20 are provided inside the housing 2. A game system of the game apparatus 1 will be described below, and a structure of the housing 2 of the game apparatus 1 will be described herein.

As illustrated in FIGS. 1 and 2, the panel support section 40 supporting the panel 21 of the card reader 20 is a base portion of the housing 2. The panel support section 40 basically includes a top plate 41, a bottom plate 42, a front plate 43, a rear plate 44, a left plate 45, and a right plate 46, and is formed in the shape of a box by these plate members. According to the design of the housing 2 of the game apparatus 1, the plate members 41 to 46 may be appropriately refracted or curved, and decorative members may be appropriately attached to the plate members 41 to 46. A plurality of leg members 42a is attached to the bottom plate 42 of the panel support section 40. The housing 2 may be installed on a flat ground surface through the plurality of leg members 42a.

As illustrated in FIG. 2, the top plate 41 of the panel support section 40 is formed in the shape of a plane which is parallel to the installation surface of the game apparatus 1. The panel 21 of the card reader 20 is attached to the top plate 41.

First, in the top plate 41, an approximately rectangular opening 41a is provided at the front side from the viewpoint of the standing position of the player. The opening 41a communicates through the panel support section 40 which is formed in the shape of a box.

Further, in the top plate 41, at an edge portion of the opening 41a, a step section 47 one step lower than a top surface 41' is formed. That is, as for the step section 47, a portion of the top plate 41 is recessed in the inward direction of the housing 2, and a step wall is formed at the edge portion of the opening 41a.

Still further, in the edge portion of the opening 41a, at the lowermost position of the step section 47, a flange 41b protruding toward the center of the opening 41a is formed. The flange 41b is at least formed at the front edge of the back edge of the opening 41a, and is preferably formed at the entire edge of the opening 41a.

Furthermore, the panel 21 of the card reader 20 is inserted into the opening 41a of the top plate 41. The edge of the panel 21 abuts on the flange 41b formed at the edge of the opening 41e. Thus, the panel 21 is attached to the top plate 41 of the panel support section 40. By this means, the panel 21 is supported by the panel support section 40. Further, by providing the panel 21 at the opening 41a, it is possible to irradiate infrared rays (invisible light) from the bottom side of the panel 21, analyze light reflected from the card C, and read the identification code printed on the card C.

As illustrated in FIGS. 1 and 2, preferably, by the above structure, the panel support section 40 may support the panel 21 of the card reader 20 to be parallel to the installation surface of the game apparatus 1. By this means, by installing the game apparatus 1 on the flat ground surface, the panel 21 of the card reader 20 is also maintained to be horizontal. Since the panel 21 is set to be horizontal, the player can easily set the card C on the panel 21 and can easily slide the set card C.

Further, as illustrated in FIG. 2, in a state where the panel 21 is attached to the top plate 41, since the step section 47 is formed at the edge of the panel 21, a height difference occurs between the top surface 41' of the top plate 41 and the plane 21' of the panel 21. That is, the plane 21' of the panel 21 is set to be one step lower than the top surface 41' of the top plate 41. Thus, since the plane 21' of the panel 21 is set to be lower than the top surface 41' of the top plate 41, the card C set on the plane 21' of the panel 21 can be prevented from dropping from the panel 21.

Further, an object of the present invention is to enable the player to slide the card C set on the panel 21 even without looking the panel 21. In this regard, since the plane 21' of the panel 21 is set to be lower than the top surface 41' of the top plate 41, the player can easily know the position of the edge of the panel 21 on which the card C is set. That is, since the player can know the position of the edge of the panel 21 by abutting the card C on the wall of the step section 47, the player can easily slide the card C to a desired position even without looking the panel 21.

In FIG. 2, the height difference between the top surface 41' of the top plate 41 and the plane 21' of the panel 21 is represented by a symbol YS. Preferably, a value of the height difference YS may be at least greater than a value of the thickness of the card C used in the game. For example, preferably, the value of the height difference YS may be 1 mm to 50 mm, 5 mm to 40 mm, or 10 mm to 30 mm.

In addition, in the present embodiment, the position of the top plate 41 is recessed downward to form the step section 47; however, the step section 47 may be formed by uplifting the periphery of a portion of the top plate 41 to which the panel 21 is attached. To sum up, the step section 47 is provided at a position abutting on the edge of the panel 21, and is one step higher than the panel 21.

As illustrated in FIG. 2, the display support section 30 is attached to the top plate 41 of the panel support section 40 which acts as a base portion. The display support section 30 is provided at the back side of the top plate 41 of the panel support section 40 to which the panel 21 is attached, and has a constant upward height. In the present embodiment, the display support section 30 includes a base portion 31 which connects with the panel support section 40 and extends upward, an inclined portion 32 which connects with the base portion 31 and extends upward while inclining to the front side, and a display attachment portion 33 which is provided at the end of the front side of the inclined portion 32. The touch panel display 10 is attached to the display attachment portion 33 of the display support section 30. By this means, the touch panel display 10 is supported above the panel support section 40 by the display support section 30.

In addition, FIG. 2 illustrates an example in which the display support section 30 and the panel support section 40 are formed as separate bodies; however, the display support section 30 and the panel support section 40 may also be formed as an integrated body.

In the present invention, the touch panel display 10 is supported by the display support section 30 such that a portion thereof is located above the panel 21 of the card reader 20 in the vertical direction (Y axis direction). That is, in the embodiment illustrated in FIG. 2, the inclined portion 32 of the display support section 30 extends upward to the top side of the panel 21 in the vertical direction while inclining to the front side. Consequently, the touch panel display 10 attached to the display attachment portion 33 located at the front leading end of the inclined portion 32 is located above the panel 21 in the vertical direction. Thus, in the present invention, a portion of the touch panel display 10 overlaps a portion of the panel 21 of the card reader 20 in the vertical direction.

Hereinafter, the position relation between the touch panel display 10 supported by the display support section 30 and the panel 21 supported by the panel support section 40 will be described in detail with reference to FIG. 2.

In FIG. 2, a symbol YH represents the distance of a gap which is formed between the plane 21' of the panel 21 and a bottom end 10' of the touch panel display 10. Preferably, the gap distance YH is secured to the extent that the player's hand does not contact the bottom end 10' of the touch panel display 10 (or the bottom end of the display attachment portion 33) when the player operates the card C set on the panel 21. In addition, when the touch panel display 10 is attached to the display attachment portion 33, the gap distance YH is set also in consideration of the width of a flange portion of the display attachment portion 33. For example, preferably, the gap distance YH may be 30 mm to 400 mm, 50 mm to 300 mm, or 100 mm to 200 mm. When the gap distance YH is less than 30 mm, it is difficult to insert the end of the player's hand between the touch panel display 10 and the panel 21 and it is difficult to operate the card C. Accordingly, it may be preferable that the gap distance YH is set to be 30 mm or more. On the other hand, when the gap distance YH is more than 400 mm, it is difficult for the player to capture the touch panel display 10 and the panel 21 in his vision simultaneously. That is, a general human vision is considered to be an upward 60° and a downward 70°. Therefore, when the gap distance YH is more than 400 mm, in the range of the touch panel display 10 and the panel 21 being reached by the hand, it is difficult to capture the panel 21 at the end of the vision while looking the touch panel display 10. Therefore, preferably, the gap distance YH may be set to be 400 mm or less such that the player can operate the touch panel display 10 and the card on the panel 21 simultaneously.

Further, in FIG. 2, a symbol ZD represents a total depth of the panel 21. Furthermore, a symbol ZO represents the depth of a region overlapping a portion of the touch panel display 10 in the vertical direction, among the depth of the panel 21. As illustrated in FIG. 2, at a back side portion in the Z axis direction, the panel 21 overlaps a front side portion of the touch panel display 10 in the vertical direction. When the total depth ZD of the panel 21 is 100%, it may be preferable that the depth ZO of a region overlapping the touch panel display 10 is 5% to 50%, 10% to 40%, or 15% to 30%. When the depth ZO of the overlapping region is less than 5%, since the distance from the frontmost edge of the panel 21 to the touch panel display 10 is increased excessively, the operability is degraded. Therefore, it may be preferable that the depth ZO of the overlapping region is 5% or more. On the other hand, when the depth ZO of the overlapping region is more than 50%, since the player is disturbed by the touch panel display 10, it is difficult for the player to stretch out his hand to the most back side edge of the panel 21. Accordingly, it may be preferable that the depth ZO of the overlapping region is 50% or less. Further, it may be preferable that the depth ZO of the overlapping region is 5 mm to 300 mm, 50 mm to 200 mm, or 100 mm to 150 mm in an actual dimension.

In addition, as illustrated in FIG. 2, at the front side in the Z axis direction, the panel 21 has a portion which does not overlap the touch panel display 10 in the vertical direction. Further, at the back side in the Z axis direction, the touch panel display 10 has a portion that does not overlap the panel 21 in the vertical direction. Thus, since the touch panel display 10 and the panel 21 overlap each other with good balance in the vertical direction, the operability of the touch panel display 10 and the panel 21 can be compatible.

Further, as illustrated in FIG. 2, the touch panel display 10 is supported by the display support section 30 such that it is inclined at a predetermined angle to the plane 21' of the panel 21. Preferably, an inclination angle θ of the touch panel display 10 with respect to the plane 21' of the panel 21 may be 30° to 80° or 45° to 60°. Thus, by inclining the touch panel display 10 at the above angle, a portion of the front side of the touch panel display 10 and a portion of the back side of the panel 21 can be located to overlap each other in the vertical direction. Furthermore, when a portion of the front side of the touch panel display 10 and a portion of the back side of the panel 21 overlap each other in the vertical direction, the player can easily know that the panel 21 is located at an under side thereof, just by looking the touch panel display 10. Accordingly, the operability of the touch panel display 10 and the panel 21 located under the touch panel display 10 is improved.

The housing 2 of the game apparatus 1 has been described above, focusing on the support structures of the touch panel display 10 and the panel 21 of the card reader 20. In addition, as illustrated in FIG. 1, the housing 2 of the game apparatus 1 may be provided with a button-type operating unit 160, an audio output unit 190 for outputting a audio, an IC card reading/recording unit 194, a coin inserting unit 196 for receiving the insertion of a coin, a coin discharging unit 197 for returning a coin to the player, and a card discharging unit 198 for discharging a card received in the housing.

2. Specific Configuration of Game Apparatus

Next, a game system of the game apparatus 1 according to the present invention will be described in detail.

Figure 3:
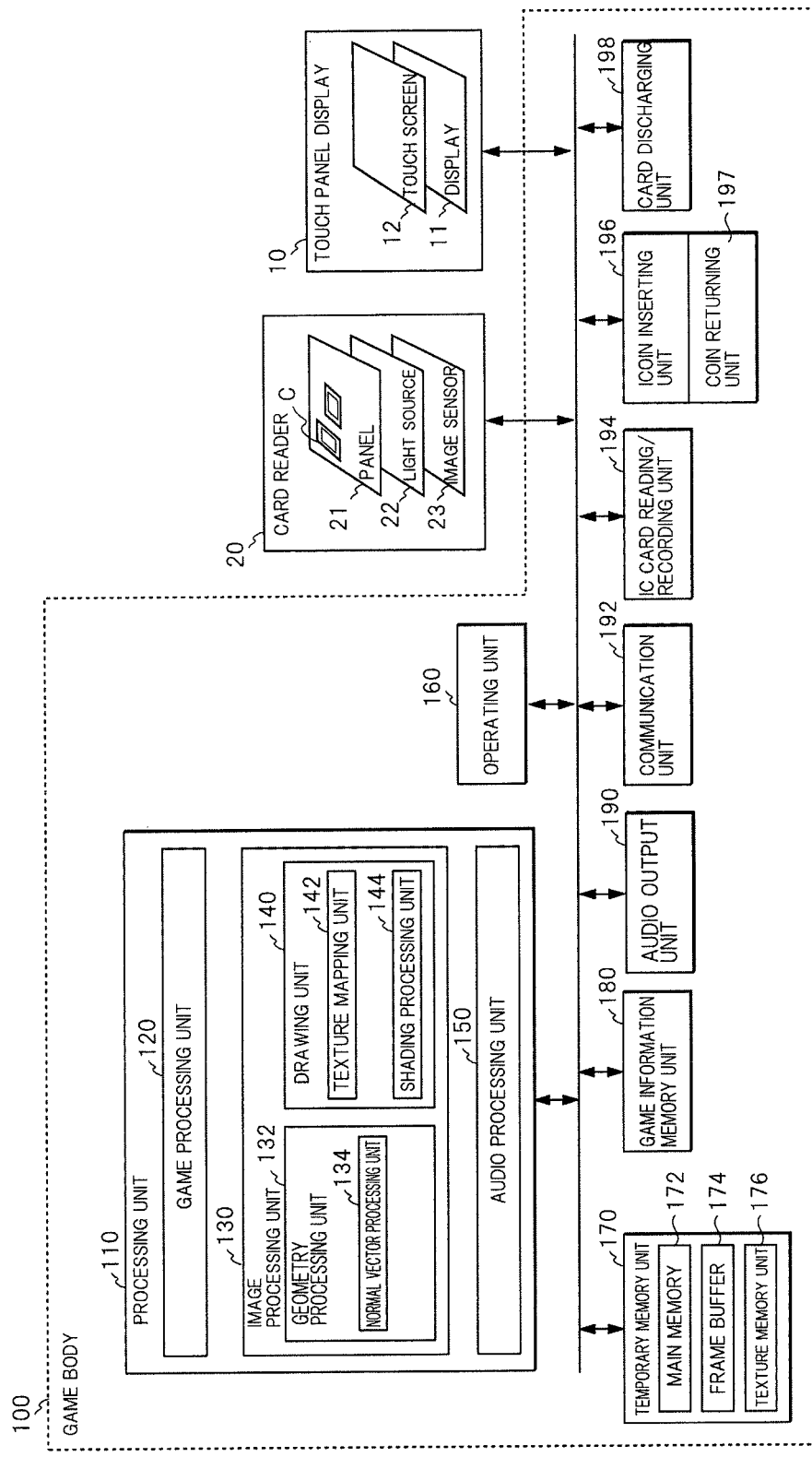
FIG. 3 is a block diagram illustrating an example of a system configuration of the game apparatus.

FIG. 3 is a block diagram illustrating a system configuration of the game apparatus 1 according to the present invention.

The game apparatus 1 according to the present embodiment includes the touch panel display 10 and the card reader 20 as described above. Furthermore, the game apparatus 1 advances a game by displaying one or more player objects on the touch panel display 10 with respect to a card C set on the card reader 20 and controlling the movement of one selected from the one or more player objects displayed.

That is, as illustrated in FIG. 3, the game apparatus 1 of the present invention basically includes a touch panel display 10, a card reader 20, and a game body section 100 which advances a game by displaying information read by the card reader 20 on the touch panel display 10.

In the present embodiment, the touch panel display 10 includes a display 11 which can display images of a plurality of player objects present in game space, and a touchscreen 12 which overlaps the front surface of the display 11 to input the coordinate on a display screen of the display 11.

Further, the card reader 20 includes a panel 21 on which a card C with a code having predetermined card information printed thereon is set, and an image sensor 23 which detects card information by reading the code of the card set on the panel 21.

Furthermore, the game body section 100 includes at least a game information memory unit 180, an image processing unit 130, and a game processing unit 120.

The game information memory unit 180 stores information about a player object in association with card information. The image processing unit 130 performs control to read the information about the player object from the game information memory unit 180 based on the card information detected by the image sensor 23 of the card reader 20, and display an image of the read player object on the display 11 of the touch panel display 10. Still further, the game processing unit 120 advances a game according to a game program based on the input information from the touch panel display 10 and the card reader 20.

As illustrated in FIG. 3, the touch panel display 10 has the display 11 and the touch screen 12. The touch panel display 10 is formed by disposing the touch screen 12 formed using a transparent material, in front of the display 10 which can display images. The display 11 is a display apparatus such as a LCD (Liquid Crystal Display) or an OELD (Organic Electro Luminescence Display). The display 11 outputs and displays various pieces of information which the player requires to use the information processing apparatus, as a still image or a movie according to an input signal from the game body 100. Further, the touch screen 12 can detect contact of the player's hand or finger according to a known electrostatic capacitance method, electromagnetic induction method, infrared scan method, resistance film method or ultrasonic surface acoustic wave method, and obtain information about the coordinate of the touch position. The positional relationship between the display 11 and the touch screen 12 is mutually linked, and the touch screen 12 can acquire information about the coordinate of a touch position on the display screen displayed on the display 11. By this means, the touch screen 12 can detect contact of the player's finger, and obtain the information about the coordinate on the screen of the display 11 which the player's finger contacted. The coordinate information acquired by the touch screen 12 is stored in a temporary memory unit 170 of the game body 100. Further, the touch screen 12 supports so-called multitouch of, when, for example, the player touches a plurality of points, acquiring information about coordinates of a plurality of these points. Furthermore, the game apparatus 1 preferably has the comparatively large touch panel display 10 mounted thereon. This is because a portion of the touch panel display 10 and a portion of the panel 21 of the card reader 20 overlap each other in the vertical direction and the touch panel display 10 is located to be close to the player. Thus, even if it includes a large-size touch panel display 10, according to the housing structure of the game apparatus 1 of the present invention, the player can touch easily the full scope of the touch panel display 10. For example, the touch panel display 100 is preferably displays of 10 inches to 75 inches, 16 inches to 40 inches or 28 inches to 38 inches.

As illustrated in FIG. 3, the card reader 20 is an apparatus which can capture an image of an identification code recorded in a card C, and has a panel 21, a light source 22 and an image sensor 23. For example, an illustration of a player object used in a game is printed on the surface of the card C, and an identification code for identifying the player object printed on the surface is recorded on the back surface of the card C. Further, for example, an identification code is printed on the back surface of the card C using an ink which cannot be viewed by means of visible light, and a pattern printed using black and white appears when specific invisible light is radiated on the card. The identification code is printed using a special ink which absorbs invisible light such as infrared ray and, when infrared ray is radiated on the back surface of the card C, the invisible light radiated on a portion except the black portion of the identification code is reflected. For example, the identification code of the card C has at least an identification number of a player object drawn in the card and information related to, for example, an orientation of the card recorded therein.

The panel 21 is provided on the upper surface of the card reader 20, and a plurality of cards C can be set on the panel 21. Further, inside the housing 2 of the game apparatus 1, for example, the light source 22 which radiates infrared ray (invisible light) on the back surface of the card C set on the panel 21, and the image sensor 23 which acquires the infrared ray reflected from the back surface of the card C set on the panel 21 and captures an image of a pattern of card data recorded in the card C are provided. The light source 22 is, for example, a light emitting diode (LED) which emits invisible light such as infrared ray or ultraviolet ray which is invisible to the eyes. The image sensor 23 is, for example, an image capturing element which captures an image of an identification code by means of infrared ray which is reflected on the back surface of the card C and is incident on the housing 2. Further, the card reader 20 can acquire unique card information of the card C by analyzing this identification code. The card information acquired by the card reader 20 is transmitted to a processing unit 110 of the game body 100, and stored in the temporary memory unit 170.

The identification code of the card C has at least an identification number of a player object drawn in the card and information related to, for example, an orientation of the card recorded therein. Hence, by referring to an object table stored in the game information memory unit 180 or the temporary memory unit 170 based on the card information acquired from the card reader 20, the processing unit 110 of the game body 100 can learn a status, a type, a name and an attribute of the player object recorded in the card C and, moreover, the characteristics of the player object matching the orientation or the position of the card C. An example of a player object is a game character. Further, the image sensor 23 of the card reader 20 detects the position at which infrared ray light is reflected from the back surface of the card C, so that the processing unit 110 of the game body 100 can calculate the position at which the card C is set on the panel 21 as coordinate information. Furthermore, the image sensor 23 continuously detects reflection positions of infrared ray, so that it is possible to obtain information that the card C set on the panel 21 moves from a certain position to another position.

Figure 4:
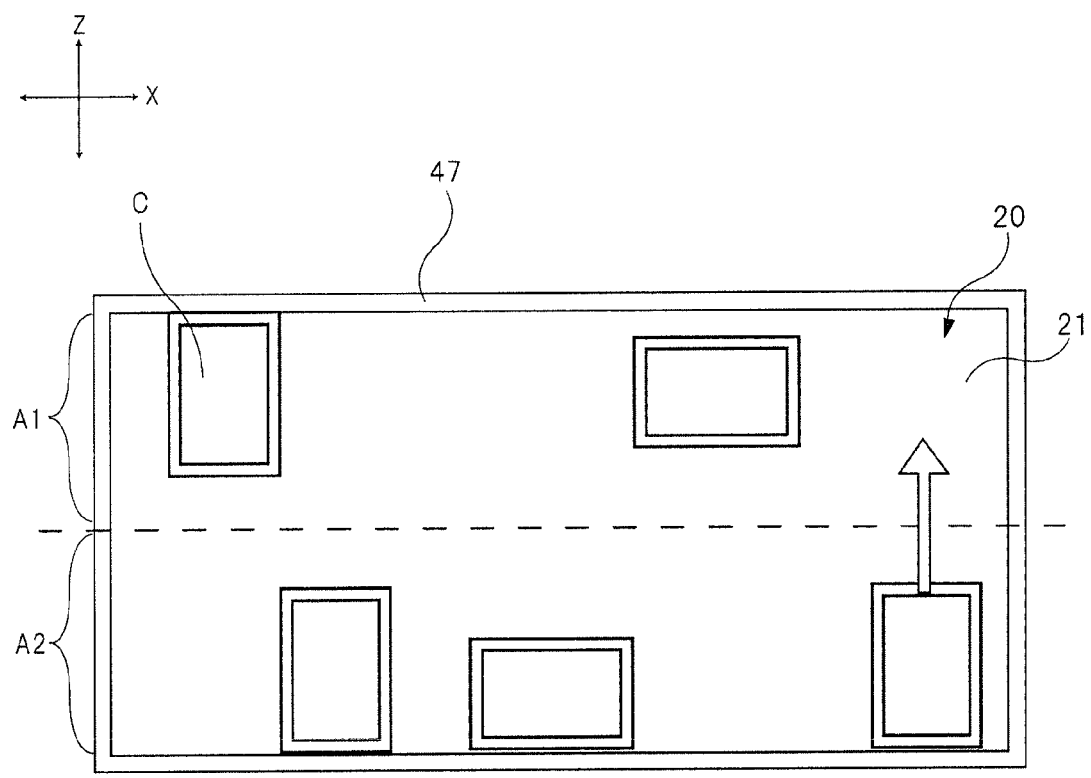
FIG. 4 schematically illustrates a card reader on which a plurality of cards is set.

Still further, as illustrated in FIG. 4, the panel 21 of the card reader 20 is preferably partitioned into a plurality of areas. The number of partitions of the panel 21 can be, for example, 2 to 10. In an example illustrated in FIG. 4, the panel 21 of the card reader 20 is divided into two of an offensive area A1 (first area) and a defensive area A2 (second area). As illustrated in FIG. 4, an offensive area A1 is an area which is provided at the back side of the panel 21 in the Z axis direction. Further, a defensive area A2 is an area which is provided at the front side of the panel 21 in the Z axis direction. This area is divided according to the coordinate on the panel 21, and the panel 21 is not physically divided. Therefore, the player can slide each card C between the offensive area A1 and the defensive area A2. By acquiring the position of each card C on the panel 21 as coordinate information, the processing unit 110 of the game body 100 can decide which one of the offensive area A1 and the defensive area A2 the position of each card C belongs to.

Further, as illustrated in FIG. 4, in the game apparatus of the present invention, a step section 47 is formed one step higher than and along the edge of the panel 21. Therefore, the player can easily move the card C to the offensive area A1 by abutting the card C on the step section 47 of the back side of the panel 21. Likewise, the player can easily move the card C to the defensive area A2 by abutting the card C on the step section 47 of the front side of the panel 21. Therefore, even without looking each card C, by touching the step section 47 of the edge of the panel 21 or each card C, the user can easily know which of the offensive area A1 and the defensive area A2 each card C is located at. Accordingly, the player can move the card C on the panel 21 without looking the panel 21 while looking the touch panel display 10.

Further, as illustrated in FIG. 4, the rectangular card C can be set vertically or horizontally on the panel 21 of the card reader 20. In this case, the processing unit 110 of the game body 100 can decide whether the card C is set vertically or horizontally, based on detection information from the card reader 20. For example, an identification code is printed on the back surface of the card C. This identification code includes information related to the orientation of the card. Consequently, the processing unit 110 of the game body 100 can decide whether the card C is set vertically or horizontally by reading the identification code by means of the card reader 20 and analyzing the orientation of the card C based on the read identification code.

The game body 100 has the processing unit 110, and reads and executes a game program and controls an entire operation of the game apparatus according to the game program. As illustrated in FIG. 3, the game body 100 has the following configuration.

The processing unit 110 performs various processing such as control of the entire system, an instruction to give a command to each block in the system, game processing, image processing and audio processing. The function of the processing unit 110 can be realized by hardware such as various processors (for example, a CPU or a DSP) or an ASIC (for example, a gate array), or a given program (game program).

The processing unit 110 includes a game processing unit 120, an image processing unit 130 and an audio processing unit 150. More specifically, the processing unit 110 includes a main processor, a coprocessor, a geometry processor, a drawing processor, a data processing processor, and a four arithmetic operation circuit or a generalized arithmetic operation circuit. These processors and circuit are adequately coupled through a bus, and can receive and send signals. Further, the processing unit 110 may have a data extension processor for extending compressed information.

Meanwhile, the game processing unit 120 performs various game processings such as processing of displaying an object on the display 11 based on card information acquired by the card reader 20, processing of scrolling the position of a view point (the position of a virtual camera) or an angle of view (a rotation angle of the virtual camera) on the display 11, processing of arranging an object such as a map object in object space, processing of selecting an object, processing of moving the object (motion processing), processing of calculating the position or the rotation angle of the object (the rotation angle around an X, Y or Z axis), processing of receiving coins (price), processing of setting various modes, processing of advancing a game, processing of setting a selection screen, hit check processing, processing of computing a game result (achievement or score), processing of allowing a plurality of players to play a game in common game space or game-over processing, or processing of issuing the cards, based on input data from the touch screen 12, the card reader 20 and an operating unit 160 and a game program.

The image processing unit 130 performs various image processings according to, for example, an instruction from the game processing unit 120. The game processing unit 120 reads image information of an object and game space from the game information memory unit 180 based on information about the position of a view point and an angle of view, and writes the read image information in the temporary memory unit 170. The game processing unit 120 supplies scroll data for moving the view point to the image processing unit 130. The image processing unit 130 reads image information per frame from the temporary memory unit 170 based on given scroll data, and has the display 11 display images of the object and the game space according to the read image information. By this means, the display 11 displays the object and the game space based on the view point. Further, the image processing unit 130 moves the view point in the game space according to the coordinate inputted to the touch screen 12. Furthermore, the image processing unit 130 reads frames from the temporary memory unit 170 based on the information about the moving view point, and has the display 11 display the read image. Thus, by scrolling the view point in the game space, the display screen transitions.

Further, the image processing unit 130 reads the card information acquired from the temporary memory unit 170 by the card reader 20, and refers to the object table stored in a game information memory unit 180 based on this card information. Furthermore, the image processing unit 130 reads image data of the player object associated with the card information from the temporary memory unit 170 or the game information memory unit 180 based on link information stored in the object table. Still further, the image processing unit 130 generates the player object in the game space according to the image data of the read player object, and has the display 11 display the object.

The game processing unit 120 controls a behaviour of the object which appears in the game space, based on the information about the coordinate inputted to the touch screen 12, the orientation or the position of the card set on the card reader 20 and operation information from other operating unit 160 (a lever, button or a controller). For example, the game processing unit 120 refers to the coordinate information of the player object displayed on the display 11 and the coordinate information inputted to the display 11, and decides whether or not the player touches the player object. That is, the game processing unit 120 decides that the user touched and selected the player object when position information inputted to the touch screen 12 and position information of the player object match. Further, when an operation or an instruction is given to the selected player object, processing matching a game program is performed according to the operation or the instruction.

According to an instruction from the game processing unit 120 based on a game program, the audio processing unit 150 generates various audio data such as sound effects and BGM.

Functions of the game processing unit 120, the image processing unit 130 and the audio processing unit 150 may all be realized by hardware or may all be realized by programs. Alternatively, these functions may be realized by both of the hardware and the programs.

As illustrated in FIG. 3, for example, the image processing unit 130 has a geometry processing unit 132 (three-dimensional coordinate computing unit) and a drawing unit 140 (rendering unit).

The geometry processing unit 132 performs various geometry computations (three-dimensional coordinate computation) such as coordinate transformation, clipping processing, perspective transformation and light source calculation. Further, object data (for example, top coordinate, top texture coordinate or brightness data of the object) for which geometry processing has been performed (perspective transformation has been performed) is stored in a main memory 172 of the temporary memory unit 170 and kept. The geometry processing unit 132 may include a normal vector processing unit 134. The normal vector processing unit 134 may perform processing of rotating a normal vector of each top of the object (a normal vector on a plane of the object in a broad sense) according to a rotation matrix from a local coordinate system to a world coordinate system.

The drawing unit 140 draws the object in a frame buffer 174 based on the object data for which geometry computation has been performed (perspective transformation has been performed) and a texture stored in a texture memory unit 176. The drawing unit 340 includes, for example, a texture mapping unit 142 and a shading processing unit 144. More specifically, the drawing unit 140 can be implemented by a drawing processor. The drawing processor is connected to the texture memory unit, various tables, a frame buffer and a VRAM, and is further connected with the display. The texture mapping unit 142 reads an environment texture from a texture memory unit 176, and maps the read environment texture on the object. The shading processing unit 144 performs shading processing with respect to the object. For example, the geometry processing unit 132 calculates a light source, and obtains the luminance (RGB) of each top of the object based on information about a light source for shading processing, an illumination model, and a normal vector of each top of the object.

The operating unit 160 allows a player to input operation data. The function of the operating unit 160 is realized by a controller having, for example, a lever, a button and hardware. Processing information from the operating unit 160 is sent to the main processor through a serial interface (I/F) or the bus.

The game information memory unit 180 stores game programs, objects displayed on the display 11 and information related to image data in game space. The game information memory unit 180 is, for example, a ROM, and is realized by a non-volatile memory such as an optical disk (CD or DVD), a magnetooptical disk (MO), a magnetic disk, a hard disk or a magnetic tape. The processing unit 110 performs various processings based on information stored in this game information memory unit 180. The game information memory unit 180 stores information (programs or the programs and data) for executing means of the present invention. Part or all of information stored in the game information memory unit 180 may be written to the temporary memory unit 170 when, for example, a power is applied to the system.

The information stored in the game information memory unit 180 includes, for example, at least two of a program code for performing predetermined processing, image data, audio data, shape data of a display object, table data, list data, information for instructing processing of the present invention and information for performing processing according to the instruction. For example, the table data includes data of an object table which stores a status, a type, a name and an attribute of an object, and characteristics of the object matching the orientation or the position of the card, in association with an identification number of the object. The status of the object is information in which, for example, a moving speed, a hit point, offense power and defence power are stored as numerical values. The game processing unit 120 can decide superiority and inferiority of, for example, the moving speed, the hit point and the offense power of each object by referring to the status stored in the object table. Thus, the game processing unit 120 changes the game progress when the card is horizontal or vertical.

Furthermore, the characteristics of the object matching the orientation of the card are data which changes according to the orientation of the card set on the panel 21 of the card reader 20. For example, as to objects related to a given card, the object table stores information which is different when the card is vertically set or horizontally set. For example, when the card is vertically set and horizontally set, the status of the object may change.

Further, the characteristics of the object matching the position of the card is data which changes according to the position at which the card is set on the panel 21 of the card reader 20. For example, as to objects related to a given card, the object table stores information which is different when the card is positioned in the offensive area A1 (first area) and when the card is positioned in the defensive area A2 (second area). For example, when the card is positioned in the offensive area A1 and when the card is positioned in the defensive area A2, the status of the object may change. Thus, the game processing unit 120 changes game advancement between the case where the card is located at the offensive area A1 and the case where the card is located at the defensive area A2.

The audio output unit 190 outputs the audio data generated by the audio processing unit 150 as an actual sound. The function of the audio output unit 190 can be realized by hardware such as a speaker. An audio output is applied audio processing by a sound processor connected to, for example, the main processor through the bus, and is outputted from the audio output unit such as the speaker.

A communication unit 192 is an arbitrary unit which performs various controls for performing communication with an outside (for example, a host server or another game apparatus). By connecting the game apparatus with a host sever on a network or another game apparatus through the communication unit 192, it is possible to play a match play or a combination play of a game. The function of the communication unit 192 can be realized by various processors, hardware such as a communication ASIC or a program. Further, a program or data for executing a game apparatus may be distributed from an information storage medium of a host apparatus (server) to the game information memory unit 180 through the network and the communication unit 192.

The IC card reading/recording unit 194 may read data from an IC card including an integrated circuit, or may record data on the IC card. The IC card reading/recording unit 194 may perform data reading/recording by contact or non-contact. For example, the IC card reading/recording unit 194 may read/write data by inserting the IC card, or may read/write data by approaching or contacting the IC card. When the IC card reading/recording unit 194 is a non-contact type, the IC card reading/recording unit 194 is realized by hardware such as an RFID reader. For example, player identification information for specifying a player having the IC card is recorded in the IC card. When the player identification information is read from the IC card by the IC card reading/recording unit 194, the game processing unit 120 communicates with a host server through the communication unit 192, and downloads player information such as the game advancement state of the player, personal information (for example, sex and age) of the player, and save data of the game from the host server, based on the player identification information. The game processing unit 120 executes the game based on the downloaded player information.

The coin inserting unit 196 receives a game fee (coin) from the player. The game processing unit 120 calculates the total amount of coins inserted into the coin inserting unit 196, and performs processing of starting the game when the total amount of the coins is equal to or greater than a predetermined value. On the other hand, when receiving a return request for a game fee (coins) from the player, the game processing unit 120 extracts coins from a coin accumulating unit (not illustrated) provided in the housing, and discharges the coins from the COIN RETURNING UNIT 197.

According to an instruction from the game processing unit 120, the card discharging unit 198 discharges a card from a card accumulating unit (not illustrated) which accumulates a plurality of cards. Preferably, the discharged card has an identification code printed on the rear surface or the front surface and can be used in the game. When determining that the game result satisfies a predetermined condition, the game processing unit 120 may discharge a predetermined number of cards through the CARD DISCHARGING UNIT 198. The player receives the card discharged by the card discharging unit 198, and may use the received card in the next game. Further, when a predetermined amount or more of coins has been received from the player, the game processing unit 120 may discharge a card from the card discharging unit 198 without executing the game. By this means, the player may purchase only a card through the game apparatus 1 of the present invention.

[Operation Example of Game Apparatus]

Next, an operation example of the game apparatus employing the above configuration will be described. Hereinafter, the system of the game executed by the game apparatus will be described using an example. For example, the game apparatus according to the present invention can play a match game using communication such as Internet. In this match game, each game user plays a match by having a plurality of player objects (game characters) appear in one game space. In an example of the game described below, the player performs an instruction operation such as appearance, movement, offense and defense of each player object through, for example, the touch panel display 10 and the card reader 20 to beat enemy objects (Enemy), conquer a tower and break a stone.

Figure 5:
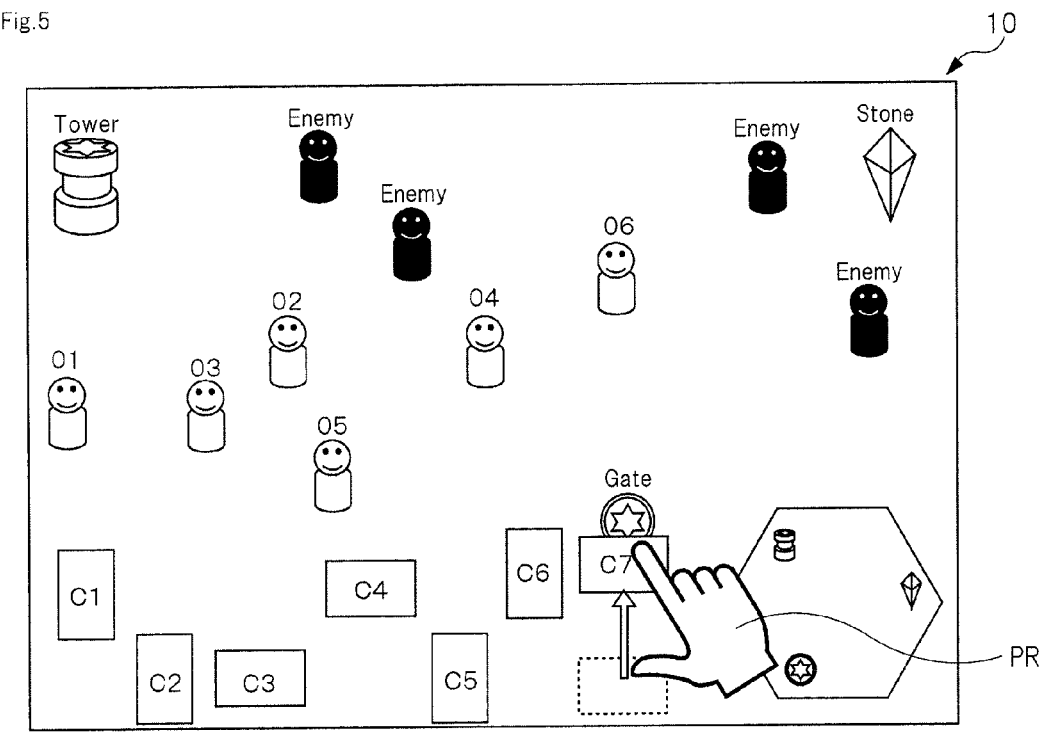
FIG. 5 is a diagram for describing an example of a game executed by the game apparatus.
Figure 5:
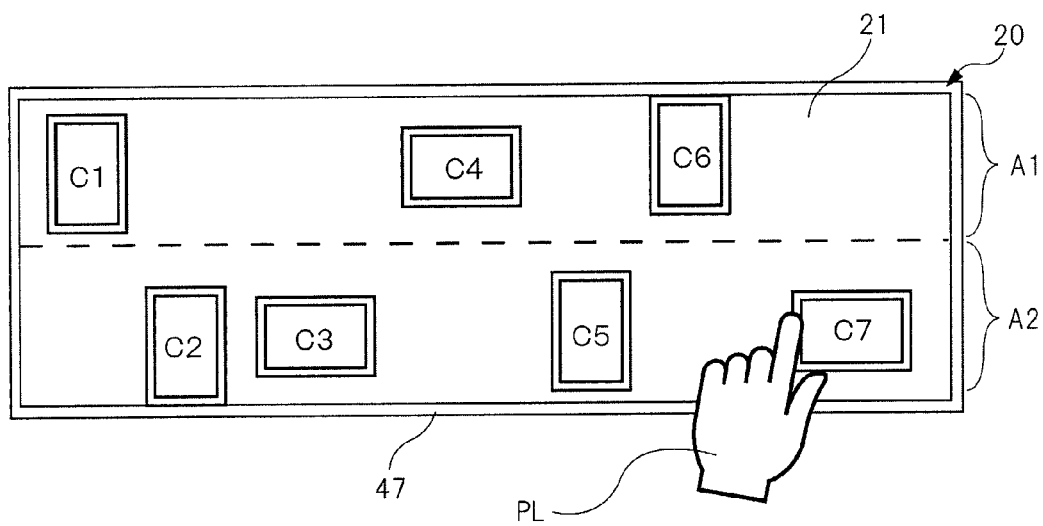

FIG. 5 conceptually illustrates states of the touch panel display 10 and the card reader 20 when a game is actually played using the game apparatus according to the present invention. In FIG. 5, a reference symbol PR indicates right hand of the player, and a reference symbol PL indicates left hand of the player. The user sets desired cards C1 to C7 on the card reader 20. The identification code is printed on the back surface of each of the cards C1 to C7. When reading the identification code of each of the cards C1 to C7, the card reader 20 analyzes card information based on the identification code, and transmits card information to the processing unit 310 of the game apparatus. Further, the card reader 20 can learn the orientation and the position of each of the cards C1 to C7. In an example illustrated in FIG. 5, on the card reader 20, the cards C1, C2, C5 and C6 are vertically set, and the cards C3, C4 and C7 are horizontally set. Further, in the example illustrated in FIG. 5, on the card reader 20, the cards C1, C4 and C6 are positioned in the offensive area A1, and the cards C2, C3, C5 and C7 are positioned in the defensive area A2. Information detected by the card reader 200 is transmitted to the processing unit 110, and the processing unit 110 refers to the object table stored in the game information memory unit 180 (or the temporary memory unit 170) based on the card information and information about, for example, the orientation of the card and the position of the card, and reads information (for example, image data and a status) about the player object associated with the card information. The processing unit 110 has the touch panel display 10 display images based on the read image data.

In an example illustrated in FIG. 5, the touch panel display 10 displays the images of the cards in a lower area of the touch panel display 10. The images of the cards displayed on the touch panel display 10 match an arrangement order of each of the cards C1 to C7 set on the card reader 20 and the orientation of each of the cards C1 to C7. That is, the processing unit 110 determines the locations and directions of actual cards C1 to C7 set on the panel 21 based on the information read by the card reader 20, and displays images of the respective cards C1 to C7 on a portion of the touch panel display 10 in the directions and positions corresponding to the actual card C1 to C7. That is, the processing unit 110 may display the images of the respective cards C1 to C7 on the touch panel display 10 in the relative positions and the same arrangement order as the actual cards C1 to C7 set on the panel 21. Thus, by displaying the image of each of the cards C1 to C7 set on the card reader 20, on part of the touch panel display 10, the user can learn an arrangement and the orientation of each of the cards C1 to C7 by viewing the touch panel display 10 without visually checking the card reader 20.

In addition, the touch panel display 10 may display information about which of the offensive area A1 and the defensive area A2 the respective cards C1 to C7 set on the panel 21 is located at, by an icon or a cursor.

In the example illustrated in FIG. 5, the player objects (game characters) O1 to O6 associated with the cards C1 to C6 are displayed on the display screen of the touch panel display 10. Each player object has a unique status, a type, a name, an attribute and characteristics matching the orientation or the position of the card. The status of the player object is information in which, for example, a moving speed, a hit point, offense power and defense power are stored as numerical values. These pieces of information are stored in the object table in association with identification information of each player object. While it is possible to set player objects the cards of which are vertically arranged to carry out normal offenses, it is possible to set player objects the cards of which are horizontally arranged to carry out special offenses. Further, while it is possible to make a setting to increase numerical values of offence power of the player objects the cards of which are positioned in the offensive area A1, it is possible to make a setting to increase numerical values of defense power of player objects the cards of which are positioned in the defensive area A2. Furthermore, in the example illustrated in FIG. 5, the player object (O7) associated with the card C7 is not displayed on the touch panel display 10. To have the object (O7) appear in the game space, the image of the card C7 displayed on the touch panel display 10 is touched, and the image of the card C7 is dragged to the position at which a call gate is displayed. When the image of the card C7 is dropped at the position at which a call gate is displayed, the player object (O7) associated with the card C7 appears in the game space, and is displayed on the touch panel display 10. In addition, the position coordinate of the call gate in the game space is stored in the game information memory unit 180 and the temporary memory unit 170, and the position of the call gate is learned by the game processing unit 120.

Figure 6A:
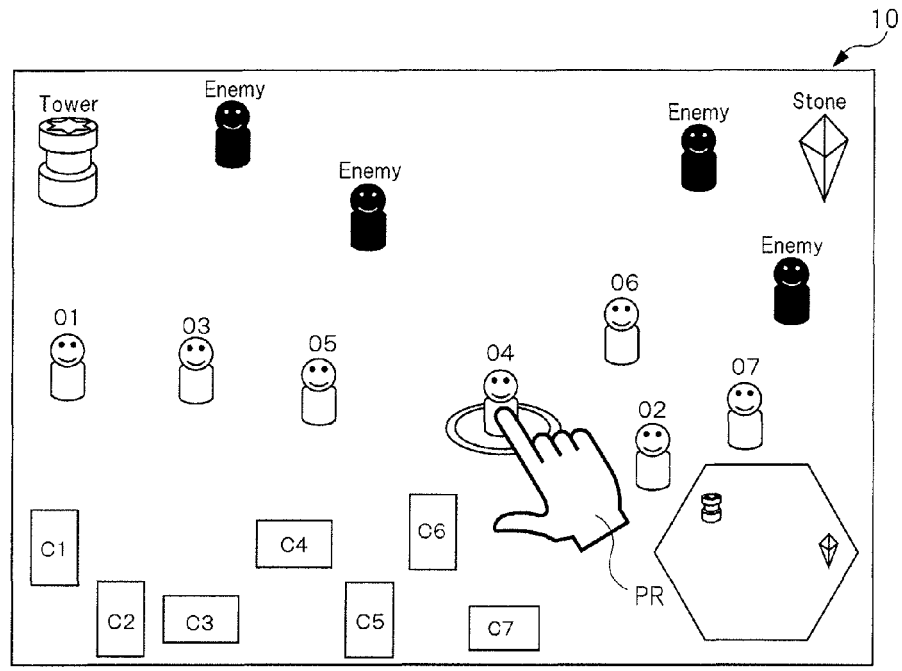
FIGS. 6(*a*) and 6(*b*) are diagrams for describing an example of a game executed by the game apparatus.
Figure 6B:
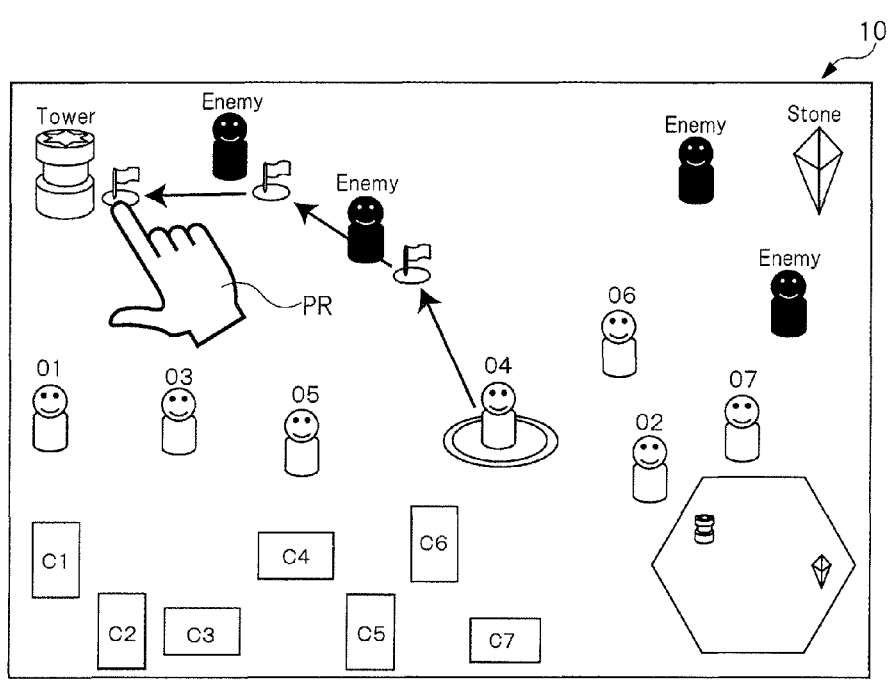

FIGS. 6(a) and 6(b) illustrate examples of an operation of moving player objects displayed on the touch panel display 10. When the user touches the touch panel display 10, the touch panel display 10 obtains the coordinate of the touch position. The processing unit 110 refers to the coordinate of the touch position and the coordinate at which the player object is displayed, and decides whether or not the coordinate of the touch position and the coordinate at which the player object is displayed match. When the touch position and the position of the player object match, the processing unit 110 learns that the player object was selected. In an example in FIG. 6(a), the player object O4 is selected. Further, when the user touches the display screen of the touch panel display 10 in a state where the player object O4 is selected, the processing unit 110 stores the coordinate of the touch position in the temporary memory unit. Particularly, when the user touches a plurality of points in a state where the player object O4 is selected, the processing unit 110 stores the coordinates of the touch positions in the temporary memory unit together with information about the touch order. Further, the processing unit 110 performs processing of moving the player object O4 touched and selected by the user to a point which the user touches next. The moving speed varies per player object. Then, the processing unit 110 reads a numerical value of the moving speed related to the player object O4 from the object table. Further, the player object O4 is moved from the first point to a moving destination point based on the numerical value of the read moving speed. Furthermore, when a plurality of points is touched, the selected player object O4 is sequentially moved to each point according to the touch order. In addition, when the moving player object O4 encounters an enemy object during movement or arrives at a tower, processing of playing a match with the enemy object or processing of conquering the tower only needs to be performed similar to the known game system.

A characteristic system of the game executed by the game apparatus according to the present invention has been mainly described above. A known game apparatus which has a card reader or a known game apparatus which has a touch panel display can be adequately applied to other game processings.

3. Other Embodiments

Figure 7:
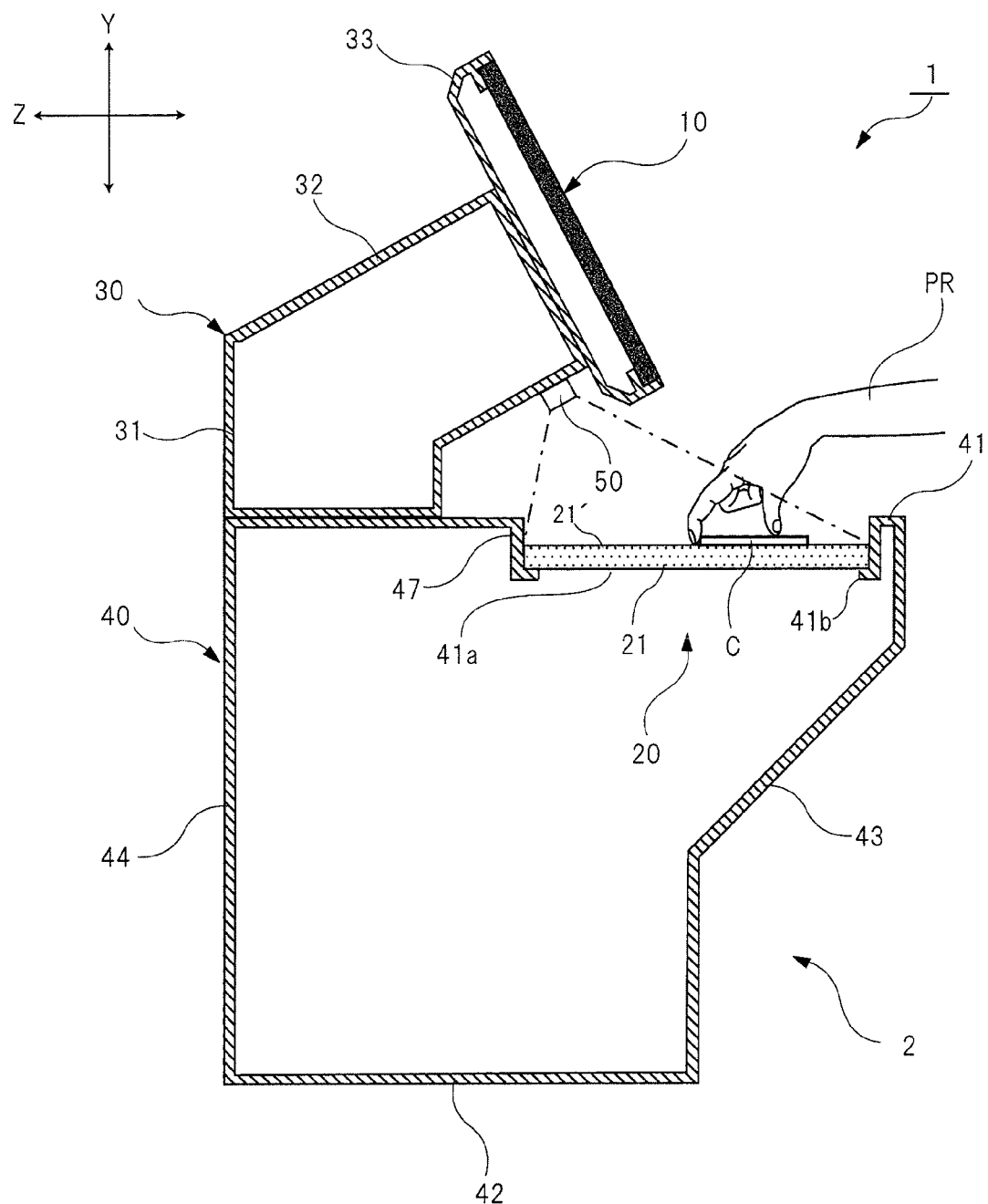
FIG. 7 is a schematic cross-sectional view for describing a game apparatus according to another embodiment.

Next, a game apparatus according to another embodiment of the present invention will be described. FIG. 7 is a cross-sectional view of a housing of a game apparatus according to another embodiment. FIG. 7 illustrates a cut state of the housing of the game apparatus at the same position as FIG. 2. Hereinafter, another embodiment of the game apparatus will be described, focusing on the difference from the above-described embodiment. In addition, in FIG. 7, the same element as in the above embodiment will be denoted by the same symbol, and a description thereof will be omitted.

As illustrated in FIG. 7, the game apparatus 1 according to the present embodiment further includes a sensor 50 for detecting the position of any one or both of a card C set on the panel 21 and a human hand PR which handles the card C.

As illustrated in FIG. 7, in order to detect a card C and a player's hand (right hand), the sensor 50 needs to be provided at a position at which the entire plane 21' of the panel 21 of the card reader 20 can be sensed. Therefore, the sensor 50 is attached to the display support section 30 which supports the touch panel display 10. That is, as described above, the display support section 30 supports the touch panel display 10 such that a portion of the touch panel display 10 is located above a portion of the panel 21 of the card reader 20 in the vertical direction (Y axis direction). Therefore, at least a portion of the display support section 30 is located above the panel 21 of the card reader 20 in the vertical direction. Accordingly, the sensor 50 may be attached to a portion of the display support section 30d which is located above the panel 21 in the vertical direction. By this means, as illustrated in FIG. 7, the sensor 50 is located above the panel 21 in the vertical direction and is set to look down the panel 21, in order to sense the entire plane 21' of the panel 21. The sensor 50 may be a known sensor such as an infrared sensor, an area sensor, a CCD image sensor, or a CMOS image sensor. The sensor 50 includes, for example, a light emitting unit and a light receiving unit. The sensor 50 can obtain the position of the card C and the player's hand PR as coordinate information by receiving light irradiated from the light emitting unit by the light receiving unit and analyzing the received light.

More specifically, as illustrated in FIG. 7, the sensor 50 is attached to a position of the inclined portion 32 of the display support section 30 which faces the panel 21. As described above, the inclined portion 32 of the display support section 30 connects with the base portion 31, and extends upward to the top side of the panel 21 in the vertical direction while inclining to the front side. Therefore, by attaching the sensor 50 to the inclined portion 32 of the display support section 30, a sensing light can be irradiated onto the entire plane 21' of the panel 21. The information analyzed by the sensor 50 is transmitted to the processing unit 110.

In the present embodiment, the coordinate information on the panel 21 detected by the sensor 50 and the coordinate information on the panel 21 detected by the card reader 20 are linked by the processing unit 110. For example, it may be preferable that the same coordinate value is obtained in both of the case where the coordinate of the card C set on the panel 21 is detected by the sensor 50 and the case where the coordinate of the card C set on the panel 21 is detected by the card reader 20. The sensor 50 obtains the position of the player's hand PR handling the card C as the coordinate information on the panel 21. On the other hand, the card reader 20 obtains the position of the card C on the panel 21 as coordinate information. By this means, based on the coordinate value of the position of the player's hand PR obtained by the sensor 50 and the coordinate value of the position of the card C obtained by the card reader 20, the processing unit 110 can determine whether the card C on the panel 21 is touched by the player's hand PR. When the coordinate value of the position of the player's hand PR corresponds to the coordinate value of the position of the card C, the processing unit 110 determines that the card C is touched by the player. On the other hand, when the coordinate value of the position of the player's hand PR does not correspond to the coordinate value of the position of any card C on the panel 21, or when the coordinate value of the position of the player's hand PR is not obtained, the processing unit 110 determines that the card C is not touched by the player. When determining that the card C on the panel 21 is touched by the player's hand PR, the processing unit 110 may perform processing of displaying the information on the touch panel display 10.

Figure 8:
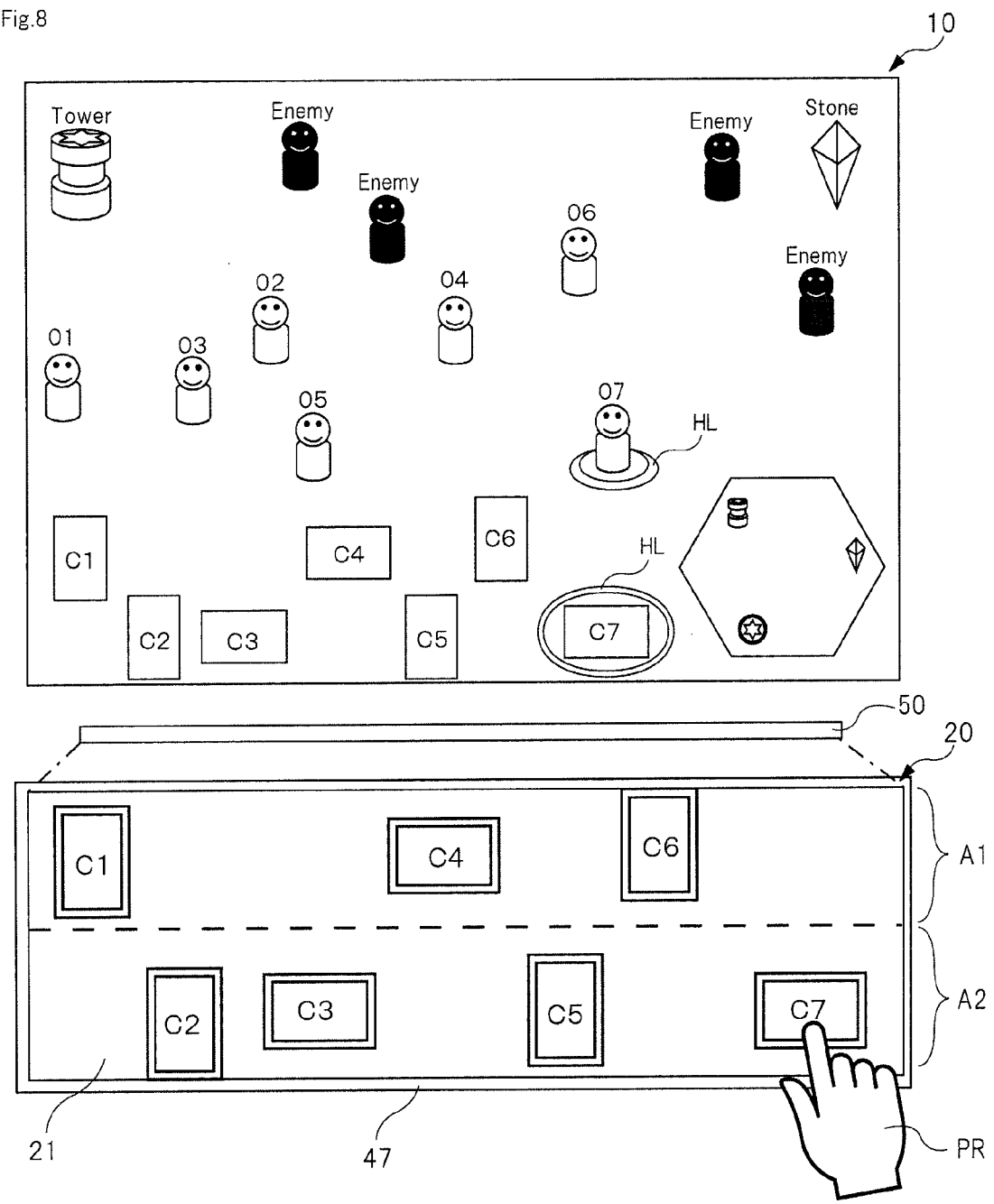
FIG. 8 is a diagram for describing an example of a game executed according to another embodiment.

Like FIG. 5, FIG. 8 conceptually illustrates the states of the touch panel display 10 and the panel 21 of the card reader 20 when a game is actually executed by the game apparatus. Further, FIG. 8 conceptually draws the sensor 50 which senses on the panel 21.

As illustrated in FIG. 8, the card reader 20 detects coordinate information of the respective cards C1 to C7 on the panel 21, and the processing unit 110 receives the coordinate information of the respective cards C1 to C7 from the card reader 20. By this means, the processing unit 110 displays images of the respective cards C1 to C7 on the touch panel display 10, corresponding to the actual arrangement and direction of the respective cards C1 to C7 set on the panel 21. Still further, player objects O1 to O7 corresponding to the respective cards C1 to C7 are also displayed on the touch panel display 10.

In this state, the player's hand (right hand) PR contacts the card C7, among the plurality of cards C1 to C7 set on the panel 21 of the card reader 20. When the player's hand PR enters into the sensing region of the sensor 50, the sensor 50 detects the coordinate position of the hand PR on the panel 21. The coordinate information of the player's hand detected by the sensor 50 is transmitted to the processing unit 110. The processing unit 110 determines that the coordinate information of the player's hand PR received from the sensor 50 matches with the coordinate information of the card C7 on the panel 21. By this means, the processing unit 110 can determine that the player's hand PR contacts the card C7.

Furthermore, when determining that the player's hand PR contacts the card C7, the processing unit 110 may highlight an image of the card C7 displayed on the touch panel display 10. In FIG. 8, the highlighted image is represented by a symbol HL. Examples of the highlighting may include enclosing the edge of the card image with a frame, flickering the card image, changing the color of the card image, and displaying an icon near the card image. By this means, the player can instantaneously know which card the player contacts, by looking the touch panel display 10 even without looking the panel 21. Further, the processing unit 110 may also highlight an image of the player object O7 associated with the card C7, in addition to the image of the card C7 which is contacted by the player. By this means, the player can instantaneously know which card the player contacts, including the correspondence relation between the card and the player object.

In the specification of the present application, the preferred embodiment of the present invention has been described above as an example with reference to the drawings. However, the present invention is not limited to the above embodiments, and incorporates changed or modified embodiments obtained based on the description of the specification of the present application within a range obvious for one of ordinary skill in art.

INDUSTRIAL APPLICABILITY

The present invention relates to, for example, an arcade-type game apparatus. Therefore, the present invention can be suitably used in the game industry.

REFERENCE SIGNS LIST

1: Game Apparatus
2: Housing
10: Touch panel display
20: Card reader
21: Panel
30: Display support section
31: Base portion
32: Inclined portion
33: Display attachment portion
40: Panel support section
41: Top plate
41a: Opening
41b: Flange
42: Bottom plate
42a: Leg member
43: Front plate
44: Rear plate
45: Left plate
46: Right plate
47: Step section
50: Sensor

The invention claimed is:
1. A game apparatus, comprising:
a touch panel display;
a card reader comprising a panel on which a card used in a game is set;
a display support which supports the touch panel display;
a panel support which supports the panel of the card reader; and
a sensor provided on the display support,
wherein the display support supports the touch panel display such that at least a portion of the touch panel display is always located vertically above at least a portion of the panel, with the portion of the touch panel display overlapping the portion of the panel in a vertical direction, the portion of the panel which is overlapped by the portion of the touch panel display in the vertical direction is at most 50% of a depth of the panel in a horizontal direction, and the sensor is provided on the display support between the portion of the touch panel display and the portion of the panel which is overlapped by the portion of the touch panel display in the vertical direction.

2. The game apparatus according to claim 1, wherein the display support supports the touch panel display such that a gap is formed between the touch panel display and the panel.

3. The game apparatus according to claim 1, wherein, when a side close to a standing position of a player with respect to the game apparatus is defined as a front side and a side distant from the standing position of the player is defined as a back side, the display support supports the touch panel display such that a portion of the front side of the touch panel display is located above a portion of the back side of the panel in the vertical direction.

4. The game apparatus according to claim 1, wherein a step is formed at a position contacting at least an end edge of the front side of the panel.

5. The game apparatus according to claim 1, wherein the sensor is configured to detect the card set on the panel or a human hand handling the card.

6. The game apparatus according to claim 1, wherein the card reader comprises a first area and a second area, with different information being provided to the game and the game advancing differently depending on whether a same card is positioned in the first area or the second area.

7. The game apparatus according to claim 1, wherein the portion of the panel which is overlapped by the portion of the touch panel display in the vertical direction is at least 5% of the depth of the panel in the horizontal direction.

8. The game apparatus according to claim 1, wherein a distance of the portion of the touch panel display which overlaps the portion of the panel and is always located vertically above the portion of the panel in the vertical direction is 5 mm to 300 mm in the horizontal direction.

9. The game apparatus according to claim 1, wherein the touch panel display includes a second portion which is not located vertically above the panel in the vertical direction.

10. The game apparatus according to claim 1, wherein an inclination angle of the touch panel display with respect to a plane of the panel is at least 30°.

11. The game apparatus according to claim 10, wherein the inclination angle of the touch panel display with respect to the plane of the panel is at most 80°.

12. The game apparatus according to claim 1, wherein a minimum distance between the portion of the touch panel display which overlaps the portion of the panel and is always located vertically above the portion of the panel in the vertical direction is at least 30 nm.

13. The game apparatus according to claim 12, wherein the minimum distance between the portion of the touch panel display which overlaps the portion of the panel and is always located vertically above the portion of the panel in the vertical direction is at most 400 nm.

14. The game apparatus according to claim 6, wherein the first area is an offensive area and the second area is a defensive area, and different information is stored in an object table of the game apparatus when the card is positioned in the offensive area than when the card is positioned in the defensive area.

15. A game apparatus, comprising:

a touch panel display;

a card reader comprising a panel on which a card used in a game is set;

a display support which supports the touch panel display; and a panel support which supports the panel of the card reader, wherein the display support supports the touch panel display such that at least a portion of the touch panel display is always located vertically above at least a portion of the panel, with the portion of the touch panel display overlapping the portion of the panel in a vertical direction, and the portion of the panel which is overlapped by the portion of the touch panel display in the vertical direction is always 5% to 50% of 100% of a total depth of the panel in a horizontal direction.

* * * * *